United States Patent
Giampavolo et al.

(10) Patent No.: US 9,914,469 B2
(45) Date of Patent: Mar. 13, 2018

(54) INFANT CARRIER TRANSPORT

(71) Applicant: SAFE-STRAP COMPANY, LLC, Fort Myers, FL (US)

(72) Inventors: Paul Giampavolo, Newton, NJ (US); Christopher M. Johnson, Glen Allen, VA (US)

(73) Assignee: Safe-Strap Company, LLC, Fort Myers, FL (US)

( * ) Notice: Subject to any disclaimer, the term of this patent is extended or adjusted under 35 U.S.C. 154(b) by 0 days.

(21) Appl. No.: 14/922,693

(22) Filed: Oct. 26, 2015

(65) Prior Publication Data
US 2016/0114824 A1   Apr. 28, 2016

Related U.S. Application Data

(60) Provisional application No. 62/068,420, filed on Oct. 24, 2014.

(51) Int. Cl.
*B62B 3/14* (2006.01)
*B62B 5/00* (2006.01)

(52) U.S. Cl.
CPC ............ *B62B 3/1444* (2013.01); *B62B 5/002* (2013.01)

(58) Field of Classification Search
CPC .............................. B62B 3/1404; B62B 3/1444
See application file for complete search history.

(56) References Cited

U.S. PATENT DOCUMENTS

| | | | | |
|---|---|---|---|---|
| 3,351,380 A | * | 11/1967 | Sprague ................ | B62B 3/1444 224/409 |
| 4,598,945 A | * | 7/1986 | Hopkins ................ | B62B 3/1444 224/158 |
| 4,861,105 A | * | 8/1989 | Merten ................ | B60N 2/2821 280/33.993 |
| 4,958,887 A | * | 9/1990 | Meeker ................ | B62B 3/1444 248/307 |
| 5,056,865 A | * | 10/1991 | Sedlack ................ | B62B 3/1444 297/256.17 |
| 5,096,260 A | * | 3/1992 | Hagerstrom .......... | B62B 3/1444 297/256.17 |
| 5,277,473 A | * | 1/1994 | Kelly .................... | B62B 3/1444 280/33.993 |
| 5,385,387 A | * | 1/1995 | Kain .................... | B60N 2/2806 297/183.3 |

(Continued)

*Primary Examiner* — Erez Gurari
(74) *Attorney, Agent, or Firm* — West Hill Technology Counsel, Inc.

(57) ABSTRACT

Infant carriers are stably supported and transported by being positioned on a frame set on wheels. The frame may include an infant carrier holder with a floor with a ramp and sidewalls. The infant carrier holder may be integral with the frame or may be mounted to a mounting device that can be adjusted for mounting angle or height. A handle is provided to the frame at a position that is suitable for a person in a wheelchair to grasp the frame and move the transport. A handle suitable for a standing person to grasp the frame may optionally be provided. The transport permits a person that may have difficulty carrying or transporting an infant carrier to more easily transport the infant carrier in a standing or a seated position, the latter as may be the case with a wheelchair occupant. The transport may be fastened to the wheelchair.

18 Claims, 15 Drawing Sheets

(56) References Cited

U.S. PATENT DOCUMENTS

| | | | | |
|---|---|---|---|---|
| 5,611,597 A | * | 3/1997 | Lanz | B62B 3/144 |
| | | | | 297/217.1 |
| 5,927,806 A | * | 7/1999 | Ohlson | B62B 3/144 |
| | | | | 297/256.13 |
| 6,955,363 B2 | * | 10/2005 | Libretti | A63H 33/30 |
| | | | | 280/33.991 |
| 8,424,138 B1 | * | 4/2013 | Pinnell | B62B 3/1444 |
| | | | | 5/118 |
| 9,120,496 B1 | * | 9/2015 | Griffith | B62B 5/00 |
| 2003/0098560 A1 | * | 5/2003 | Porter | B62B 3/106 |
| | | | | 280/33.991 |
| 2013/0292979 A1 | * | 11/2013 | Giampavolo | B62B 5/082 |
| | | | | 297/256.17 |
| 2014/0319889 A1 | * | 10/2014 | Giampavolo | B62B 3/1444 |
| | | | | 297/256.17 |
| 2016/0114824 A1 | * | 4/2016 | Giampavolo | B62B 3/1444 |
| | | | | 280/47.38 |

* cited by examiner

INFANT CARRIER TRANSPORT

RELATED APPLICATIONS

This application claims the benefit of U.S. Provisional Application No. 62/068,420, filed Oct. 24, 2014, the entire contents of which are hereby incorporated herein by reference.

BACKGROUND

The present disclosure relates generally to a support for an infant carrier, and relates more particularly to a holder for a handheld infant carrier for use with a transport device.

Handheld infant carriers are well known and widely used for transporting infants in a variety of circumstances. In the case of transporting an infant in a motor vehicle, infant carrier manufacturers sometimes provide a base that can be securely installed in a rear seating area of the motor vehicle and can accept a handheld infant carrier in a secure engagement. The combination of infant carrier and base can provide a stable and fixed transport platform so that an infant in such a carrier can be securely and safely transported in the motor vehicle. Some infant carriers are configured to be secured in a rear seating area of a motor vehicle without a mating base. Infant carriers are sometimes configured with a handle arrangement to permit the infant carrier to be handheld and transported by hand. Infant carriers are available that are designed to be easily releasable from the motor vehicle securement to permit ease of manual transport. Some types of infant carriers are also configured to be releaseably secured to a stroller, to permit the infant carrier to be transported without necessarily manually carrying the infant carrier.

In each of the configurations where an infant carrier mates to a base or stroller for transport, the mating configuration is typically proprietary to the infant carrier manufacturer. Accordingly, an infant carrier made in accordance with one manufacturer's design does not typically engage with or mate with a transport base or cart that is provided in accordance with another manufacturer's design. As a result, infant carriers tend to be usable with transport mechanisms that are specifically designed for that type of infant carrier, and no others.

A shopper with an infant in an infant carrier is often challenged with regard to transporting the infant, infant carrier and a shopping cart that is intended for transporting goods selected by the shopper in a shopping environment. The infant carrier is not ideally placed in a basket of the shopping cart, since little room is left for selected goods, and the carrier may not be stably secured. If the infant carrier is mated to an associated stroller that is specific to the infant carrier design, the shopping customer is challenged to transport the infant carrier-stroller combination and the shopping cart in a shopping environment.

Alternately, the shopper may opt to manually transport the infant in the infant carrier while pushing the shopping cart, which raises another set of challenges. For example, it may be physically difficult for the shopper to carry the infant carrier throughout the shopping experience. Handheld infant carriers can be relatively weighty and thus challenging for users to carry for a duration of a shopping trip. The shopper may set the infant carrier on a floor of the shopping environment while selecting goods, for example, which represents a challenge for protection of the infant from potential dangers such as may be presented from dropped objects, being a tripping hazard, or being hit by shopping carts. In addition, the infant is located near to the potentially unsanitary surface of the shopping environment floor.

Recognizing some of these challenges, some infant carrier manufacturers have produced designs intended to be used with popular shopping cart models that permit the infant carrier to be located on a shopping cart in a somewhat stable arrangement. For example, the infant carrier may be configured to cooperate with the handle, gate or foldout seatback of a shopping cart to obtain a somewhat stable perch for the infant carrier. This approach to meeting the above-noted challenges of handling an infant carrier in a shopping environment has several drawbacks. For example, the infant carrier tends to be mounted on the shopping cart at a fairly high location relative to the shopping cart center of gravity, potentially increasing the tip-over risk of the infant carrier or the shopping cart in combination with the infant carrier. In addition, the infant carrier configuration tends to be fairly specific to the manufacturer, as noted above, so that the infant carrier is not usable with all varieties of shopping carts, which tend to vary significantly among retail establishments. Accordingly, the customer with an infant in an infant carrier faces a number of challenges in shopping environments in general.

The use of infant carriers in other circumstances can present different challenges. For example, new mothers leaving a health facility after giving birth may have difficulty carrying an infant carrier with a new infant. Some health facilities, including some hospitals, require that an infant carrier be available for the newborn infant to be transported home.

SUMMARY

In accordance with the present disclosure, there is provided an infant carrier holder for use with a transport device. The transport device may be a wheeled vehicle that is moved manually. The infant carrier holder accommodates a wide variety of infant carriers in a stable arrangement on the transport device, including on a wide variety of shopping carts or other wheeled transports. The infant carrier holder can be mounted to a variety of transport devices, including a variety of shopping carts that may have significantly different configurations.

In an example implementation, a holder for a handheld infant carrier is provided, which acts as a mechanical interface between the infant carrier and the transport device, such as a shopping cart. The infant carrier holder can be stably secured to a manual transport device, including a majority of various shopping cart designs, and can accommodate and stably support a majority of infant carrier designs.

In some implementations, the infant carrier holder is configured to be nestable, in that the infant carrier holder can receive and accommodate at least a portion of another infant carrier holder. This feature may be provided especially when the infant carrier holder is mounted on a nestable shopping cart, for example. In addition, the infant carrier holder is stackable, e.g., for storage and shipping, so that a number of infant carrier holders can be maintained in a smaller or condensed amount of space.

The infant carrier holder may include one or more projections that protrude from an upwardly facing surface. The projection(s) is (are) configured and arranged to provide support for an infant carrier placed atop the infant carrier holder such that the infant carrier is generally stabilized when placed atop the infant carrier holder in cooperation with the projection(s).

The infant carrier holder may include one or more upright walls located at a lateral edge of the infant carrier holder. Each wall can contribute to stabilizing the infant carrier in the infant carrier holder, such as by preventing translational lateral movement of the infant carrier. The one or more upright walls can also contribute to locating the infant carrier in relation to the projection(s) discussed above, so that the stabilizing relationship obtained between the infant carrier and the projection(s) can be established and maintained.

The infant carrier holder may include a mechanism for contributing to securing the infant carrier to the infant carrier holder. For example, a strap affixed to the infant carrier holder can be secured around the infant carrier to maintain the infant carrier in the infant carrier holder. The strap may be configured to have a buckle that can be readily clasped and unclasped to secure and free the infant carrier, respectively. The strap may be adjustable to permit a custom fit to the size and shape of the infant carrier. Any other types of securing mechanisms may readily be used with the infant carrier holder, including such mechanisms as harnesses, releasable clamps, elastic cords or other components, retractable stay-bars, and any other mechanisms that can contribute to securing the infant carrier to the infant carrier holder.

A mounting mechanism may be provided for the infant carrier holder. The mounting mechanism may be adjustable, to permit a secure attachment to a variety of transport devices, including shopping carts. In an example implementation, the infant carrier holder can be attached to a shopping cart gate, to permit the infant carrier holder to swing with the shopping cart gate, such as upon the shopping cart being nested with another shopping cart, causing the gate to be rotated upward. According to another example implementation, the infant carrier holder can be attached to the frame and/or push handle of a transport device, in a position to permit nesting of multiple transport devices with infant carrier holders. The infant carrier holder can be located and positioned to avoid interfering with any other transport device functions. For example, in the case of a shopping cart, the infant carrier holder may be mounted to a basket and/or push handle in a position to permit free movement of a gate and foldout seat, so that the infant carrier holder does not obstruct the nesting action of the shopping cart.

The infant carrier holder may be located on the frame of the transport device, for example on the frame of a shopping cart within or above a region of the shopping cart basket to avoid interference with the operation of nesting related components of the shopping cart. The infant carrier holder is provided with an attachment mechanism to permit mounting to various locations on the transport device, and in the case of a shopping cart, permits mounting in locations that interfere or do not interfere with the nesting operation of the shopping cart. In some instances, some mounting locations for the infant carrier holder may be preferred for stability or ease of use, even though mounting the infant carrier in those locations may cause the transport device or shopping cart to be non-nestable with other like transport devices or shopping carts.

The infant carrier holder is composed of material that resists influences of harsh environments, including extremes of heat and cold and precipitation. The infant carrier holder may be configured to include one or more openings to permit water drainage to avoid pooling caused by precipitation, for example. The material of the infant carrier holder may be chosen to be able to resist impacts, such as may occur from contact with other transport devices or carts or infant carrier holders, as well as other objects that may be encountered during transport or in a shopping environment.

According to an example implementation, an infant carrier transport is provided. The infant carrier transport can be used in applications for a person sitting or standing and transporting an infant in an infant carrier. For example, a person sitting in a wheelchair can use the infant carrier transport to transport an infant carrier to avoid lifting and carrying the infant carrier, or to avoid positioning the infant carrier on the wheelchair, including positioning the infant carrier in the person's lap.

The infant carrier transport is provided with a frame suitable for mounting an infant carrier holder at a desired angle. The infant carrier holder may be mounted to the frame with a mounting device, or may be integral with the frame. An adjustable mount that permits mounting of the infant carrier holder at different angles can be provided to the infant carrier transport. The frame can be provided with wheels, such as casters, for example, that may be fixed in position, or pivotable. The frame may be provided with a storage space to permit other articles to be transported along with an infant carrier. Handles may be provided to the frame to permit a person to grasp and push or pull the infant carrier transport. Multiple handles may be provided to permit a person to use the transport by grasping the handles in either a standing or a sitting position. The transport may be provided with a brake to slow or obstruct movement of the transport, or to lock the transport in place.

A variable mounting device may be provided to the transport to permit the height of the infant carrier holder to be adjusted. The adjustable height of the mounted infant carrier holder permits persons in various positions and of different heights to more easily use the infant carrier transport. For example, a person using the transport may wish to have the infant carrier positioned at eye level if they are in a sitting position, such as may be the case if the person is sitting in a wheelchair, for example.

The transport can be coupled to a wheelchair or other personal transportation device with a releasable attachment mechanism. For example, hook and loop fastened straps, buckles, adjustable bars, tube frames or any other suitable device that can couple the transport to the wheelchair or personal transportation device may be used. The transport can be configured to accommodate multiple infant carriers, for example, in a stacked or side-by-side configuration. According to an aspect, the wheels of the transport can all pivot around an upwardly facing axis when the transport is coupled to a wheelchair, to permit the transport to move in lateral directions in accordance with the movement of the wheelchair.

BRIEF DESCRIPTION OF THE SEVERAL VIEWS OF THE DRAWINGS

Embodiments of the present disclosure are described in greater detail below, with reference to the accompanying drawings, in which.

DETAILED DESCRIPTION

This application is based on U.S. Provisional Application No. 62/068,420, filed Oct. 24, 2014, entitled "INFANT CARRIER TRANSPORT," the entire contents of which are hereby incorporated herein by reference.

The present disclosure provides an infant carrier holder for use with a transport device. The transport device can be, for example, a shopping cart. The infant carrier holder can act as a mechanical interface between various models of transport devices or shopping carts and various models of infant carriers. The infant carrier holder can be adapted for use with a variety of shopping cart models, and can contribute to securely accommodating infant carriers of various models and types.

Figure 1:
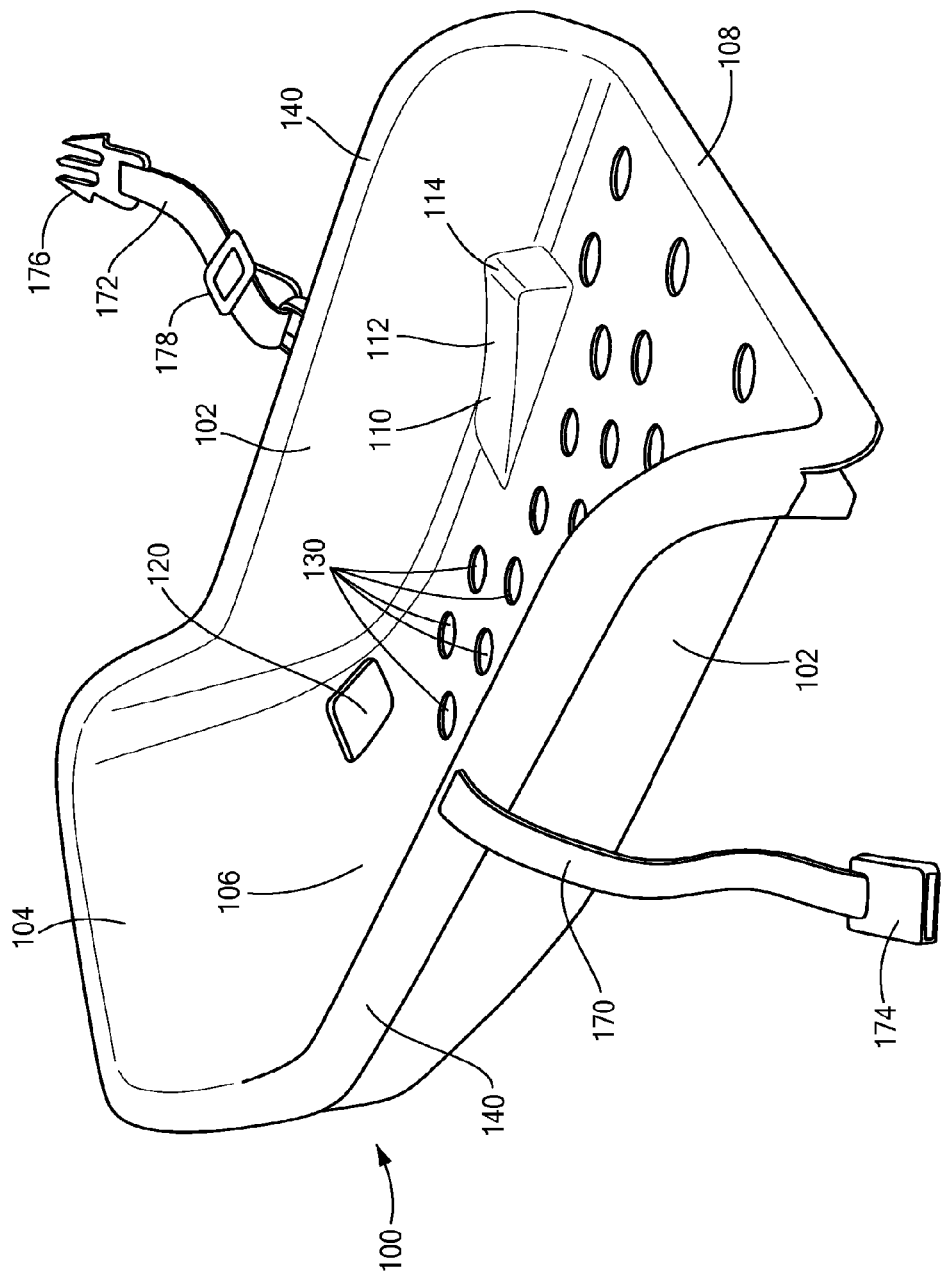
FIG. 1 is a perspective view of the infant carrier holder in accordance with an exemplary embodiment of the present disclosure.
Figure 2:
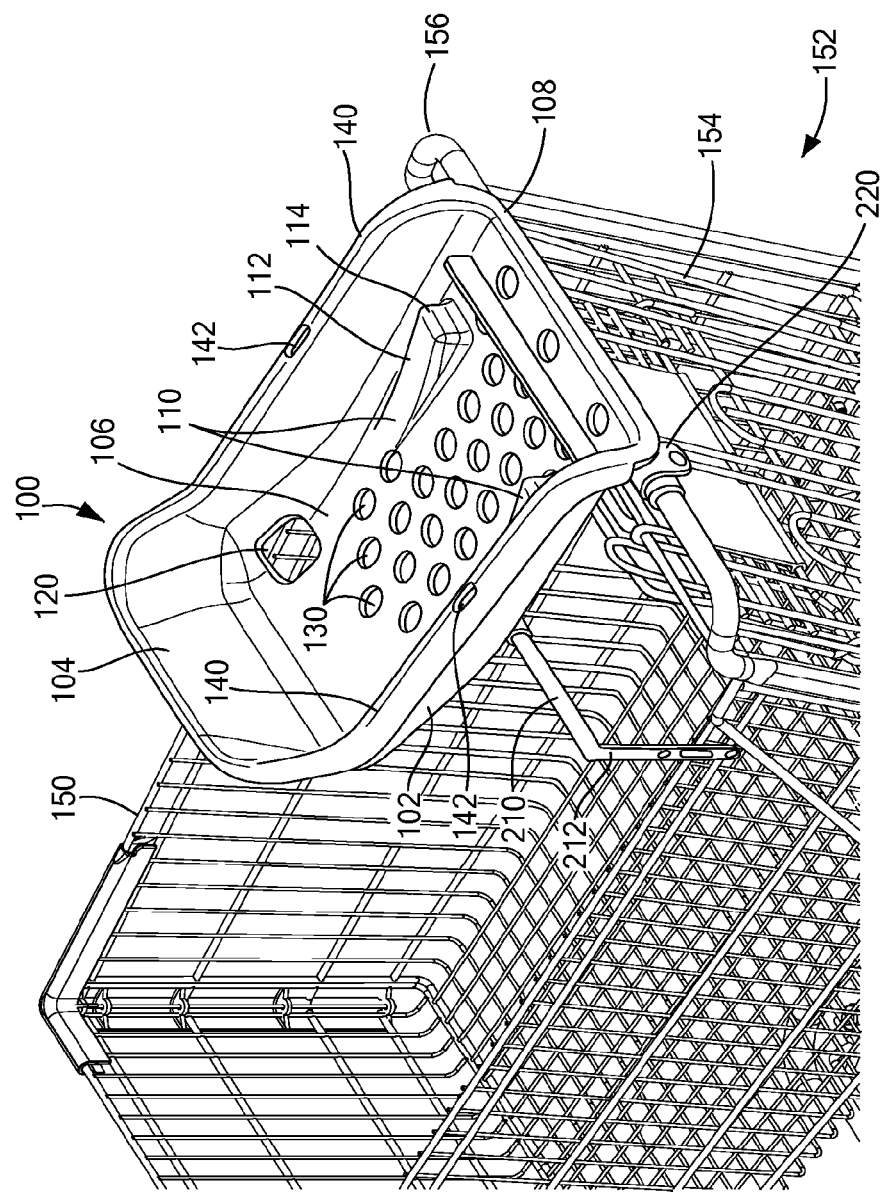
FIG. 2 is a perspective view of the infant carrier holder as used with a shopping cart in accordance with an exemplary embodiment of the present disclosure.

Referring now to FIGS. 1 and 2, an exemplary embodiment of an infant carrier holder 100, referred to herein as holder 100, is illustrated. Holder 100 has a generally concave shape and is sized to receive any of various infant carriers (not shown). Holder 100 includes opposing sidewalls 102 and a rear wall 104. Sidewalls 102 and rear wall 104 are connected together to form a concave shape in conjunction with an interior lower surface or floor 106. The concave shape of holder 100 provides lateral stability and support for an infant carrier placed atop holder 100 and generally in contact with and supported by floor 106.

Holder 100 includes ramps 110 that are situated near side walls 102 and toward a front edge 108 of holder 100. Ramps 110 are arranged to have an arcuate upper surface 112 that extends in a curved shape from a high point 114 to be coextensive with floor 106. The curved shape of surface 112 cooperates with a curved lower surface of an infant carrier to seat the infant carrier in a stable position with respect to holder 100. In general, infant carriers have curved lower surfaces that can generally cooperate with surface 112 of ramp 110 to contribute to preventing the infant carrier from sliding or changing position within holder 100. The curvature of the lower surface of infant carriers is typically an arc, which may be a circular arc that varies between model types and manufacturers, but generally has a length within a range of from about 15° to about 25°. The radius of curvature of the arc can be calculated according to Equation 1

$$r = \frac{W^2}{8H} + \frac{H}{2} \qquad \text{(Equation 1)}$$

where r is the radius of curvature, W is the width of the arc, and H is the height of the arc.

The radius of curvature of surface 112 can be in the range of from about 50 to about 200 inches, as calculated using Equation 1. The length of the arc described by surface 112 can be determined from the angular range (in radians) of from about 15° to about 25° times the radius. The shape and size of ramp 110 generally acts to prevent infant carriers placed within holder 100 from rocking or sliding by cooperating with the lower curved surface of the infant carrier. In general, ramps 110 and curved surfaces 112 provide a stabilizing support for infant carriers placed atop and/or in holder 100 to permit various models of infant carriers to be uniformly supported and stabilized on holder 100.

Figure 4:
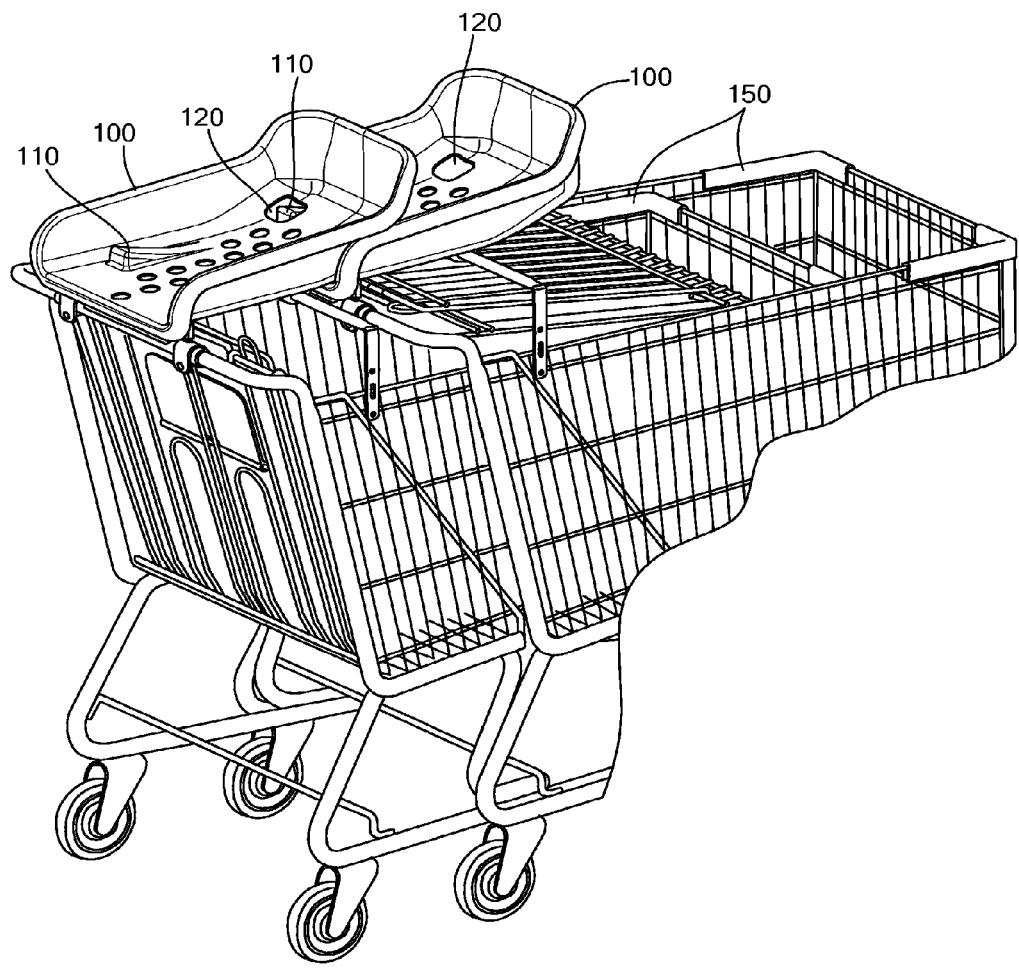
FIG. 4 is a perspective view of the infant carrier holder as used with each of two nested shopping carts in accordance with an exemplary embodiment of the present disclosure.

Holder 100 is intended to be usable with a shopping cart 150 (FIG. 2) that nests with other, like shopping carts 150. Two shopping carts 150, as shown in FIG. 4, can generally be nested by urging a front of one shopping cart 150 through a gate opening 152 of another shopping cart 150, tending to urge a gate 154 of the other shopping cart 150 upward in a pivoting motion. The nested shopping carts 150 tend to take up less space, and permit a number of nested shopping carts 150 to be handled all together. Holder 100 facilitates use on nestable shopping cart 150 with the provision of openings, such as opening 120, for example, that are located and sized to accommodate ramps 110 of another holder 100 when holders 100 are installed on sequential, nested shopping carts. In FIG. 4, nested shopping carts 150 are shown with nested holders 100 that include openings 120 that can accommodate ramps 110 when holders 100 are nested due to being mounted on nested shopping carts 150.

Referring now to FIGS. 1 and 2, holder 100 is shown in an exemplary embodiment as having a number of through openings 130 arranged in floor 106. Openings 130 permit fluids that might be collected by holder 100 to drain off of floor 106 through openings 130. For example, if holder 100 is exposed to rain in an outdoor environment, holder 100 does not collect the precipitation, instead permitting the rainwater to drain through openings 130. Similarly, if holder 100 is exposed to a spill of liquid in a shopping environment, for example, the liquid can drain through openings 130 to avoid collection of liquid by holder 100. The provision of openings 130 also reduces the amount of material used to construct holder 100. It should be understood that openings 130 are not required, and can be omitted, or provided in any useful pattern to obtain the above-noted benefits.

Holder 100 also includes rails 140 located on upper edges of sidewalls 102. Rails 140 are formed as outwardly curved portions of the upper edge of sidewalls 102. Rails 140 provide a reinforcing structure for sidewalls 102, as well as providing a location for attachment of a strap portion 170, 172 that can be used to secure the infant carrier to holder 100. For example, rails 140 may include a through opening 142, which can be used to secure an end of strap portions 170, 172 to holder 100. Rails 140 also are designed to permit a certain amount of overlap with rails 140 of another nested holder 100 when two shopping carts 150 with holders 100 are nested together, as illustrated in FIG. 4. Rails 140 thus have an upward slant from a rear to a front of shopping cart 150 to which holder 100 is mounted. The upward slant of rails 140 thus accommodates rails 140 of another nested holder 100 when holders 100 are mounted to sequentially nested shopping carts 150.

According to an exemplary embodiment of the present disclosure, holder 100 includes straps 170, 172 that are attached at one end to side rails 140, with another end attached to a respective buckle segment 174, 176. Straps 170, 172 can be coupled together around an infant carrier using buckle segments 174, 176 to secure the infant carrier in holder 100. Strap 172 includes an adjustment device 178 that can be used to adjust a length of strap 172. Although not shown in the drawings, strap 170 may alternately or additionally include an adjustment device 178 to permit strap 170 to be adjustable. The overall length of the combination of straps 170, 172 when coupled together with buckle segments 174, 176 can be adjusted using adjustment device 178 to provide a snug and secure arrangement for retaining the infant carrier in holder 100. For example, strap 172 can be adjusted using adjustment device 178 to lengthen a distance between side rail 140 and buckle segment 176 prior to coupling buckle segments 174, 176 around an infant carrier placed in holder 100. Such an adjustment permits buckle segments 174, 176 to be coupled without significant tension being placed on straps 170, 172. Strap 172 can then be adjusted to tighten straps 170, 172 around the infant carrier using adjustment device 178 to secure the infant carrier in holder 100. It should be apparent that other types of adjustment devices or securing mechanisms may be used together with, or in place of straps 170, 172, adjustment device 178 and/or buckle segments 174, 176. Such examples may include harnesses, releasable clamps, elastic cords or other elastic components, retractable stay bars, and any other mechanism that can contribute to securing the infant carrier in holder 100. For example, buckle segments 174, 176 can incorporate one or more adjustment devices, such as adjustment device 178, or can incorporate one or more securing mechanisms to secure straps 170, 172.

Figure 3:
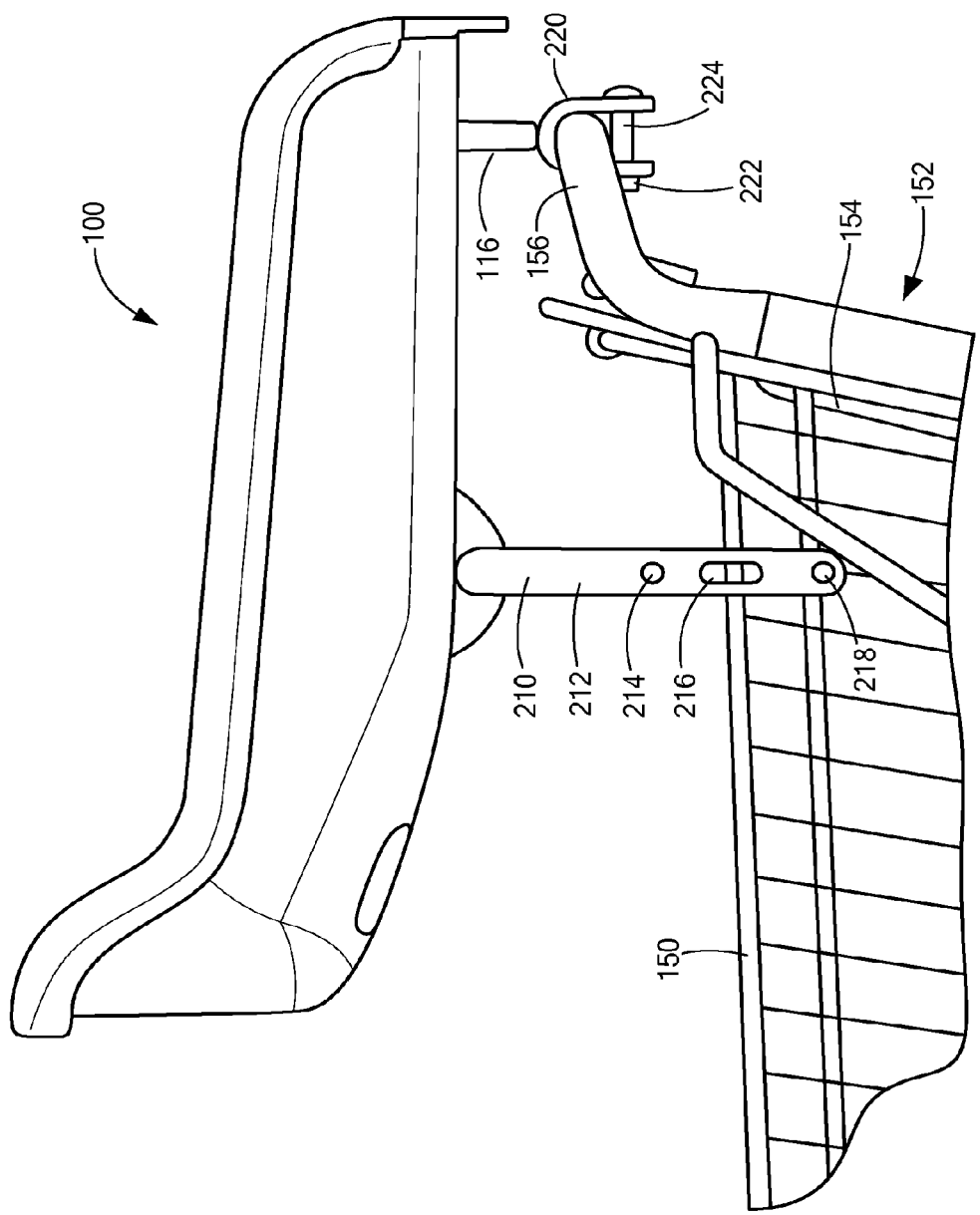
FIG. 3 is a side elevation view of the infant carrier holder as used with a shopping cart in accordance with an exemplary embodiment of the present disclosure.

Referring now to FIGS. 2 and 3, holder 100 is mounted to shopping cart 150 with brackets 210, 220. Bracket 210 includes vertical members 212 with openings 214, 216 and 218, which can be used to secure vertical member 212 to shopping cart 150. The placement of openings 214, 216 and 218 on vertical member 212 allow for adjustment in the attachment of bracket 210 to shopping cart 150. Opening 216 is a slotted opening, which permits additional flexibility in securing vertical member 212 to shopping cart 150. Shopping carts 150 can have varying tolerances in their construction among carts of the same model that can be accommodated by the variable securing location permitted by opening 216 being slotted in shape. In addition, different model carts may be used in the same retail establishment, which differences can be accommodated with the variety of securing locations provided by openings 214, 216 and 218. For example, either opening 214 or 218 may be located and secured to a particular point on a sidewall of a cart such as shopping cart 150 or a different model cart. Opening 216 may then be used to secure bracket 210 to the cart at a variable securing location by being slotted. By providing openings 214, 216 and 218 in this configuration, a number of shopping cart configurations, including that of shopping cart 150, can be accommodated for mounting holder 100.

The locations of openings 214, 216 and 218 permit brackets 210 to be secured in a position on shopping cart 150 to provide a certain height for holder 100 above an edge of the basket of shopping cart 150. The height of holder 100 above the basket edge of shopping cart 150 provides clearance for gate 154 to pivot upward when another shopping cart 150 is urged into gate opening 152 of shopping cart 150. In addition, the height of holder 100 above the basket edge of shopping cart 150 accommodates nesting of another holder 100, as illustrated in FIG. 4. Bracket 210 is located along a length of holder 100 to avoid interference with a nested holder 100 from another nested shopping cart 150, while providing suitable support for an infant carrier placed atop and/or within holder 100. The location at which bracket 210 is connected to holder 100 can be provided as a pivoting connection to permit holder 100 to be set as various heights above the basket edge of shopping cart 150 using various vertical locations for vertical member 212 being secured to a sidewall of shopping cart 150.

Bracket 220 secures holder 100 to shopping cart 150 at a handle 156, using an attachment extension 116 that extends vertically from an underside of holder 100 in a mounted position. According to an exemplary embodiment, extension 116 is molded as part of holder 100. It should be understood that extension 116, or like attachment structures can be optionally omitted or formed as part of a bracket and secured to holder 100 using any type of common securing mechanism, including screws, rivets, bolts and the like. By providing extension 116 as a molded portion of holder 100, an attachment of holder 100 to handle 156 avoids interruption in floor 106 of holder 100, for example. Extension 116 can include openings (not shown) or receptacles (not shown) for screws, rivets, bolts and the like to permit bracket 220 to be securely attached to extension 116. In accordance with an exemplary embodiment, bracket 220 is a U-bolt, shaped as a "U" and secured around handle 156 with a nut 222 and a bolt 224. Extension 116 attached to bracket 220 elevates a base of holder 100 above handle 156 to permit a shopping cart user to access handle 156 under holder 100 to be able to push a shopping cart 150.

By providing brackets 210, 220, holder 100 is elevated above shopping cart 150 in a location to permit holder 100 to be nested with other holders 100 when like shopping carts 150 are nested. Brackets 210, 220 also locate holder 100 to avoid interference with a nesting operation of shopping carts 150, but providing a clearance for gate 154 to pivot upward when shopping carts 150 are nested in addition to avoiding interference with a handle 156 of a nested shopping cart, as illustrated in FIG. 4. It should be understood that carrier 100 can be mounted in other locations on shopping cart 150, using brackets 210, 220 or other attachment configurations. In some locations, holder 100 may interfere with shopping cart 150 being urged into a nesting configuration with another shopping cart 150, or may interfere with another shopping cart 150 being urged into a nesting configuration with shopping cart 150 having holder 100. For example, holder 100 may be mounted within a basket of shopping cart 150 to lower a height of an infant carrier placed on or within holder 100. Accordingly, a shopping cart to which holder 100 is mounted need not be nestable with other like shopping carts, but can be treated separately from other carts by a manager of a retail establishment as providing the feature of an infant carrier holder.

Figure 5:
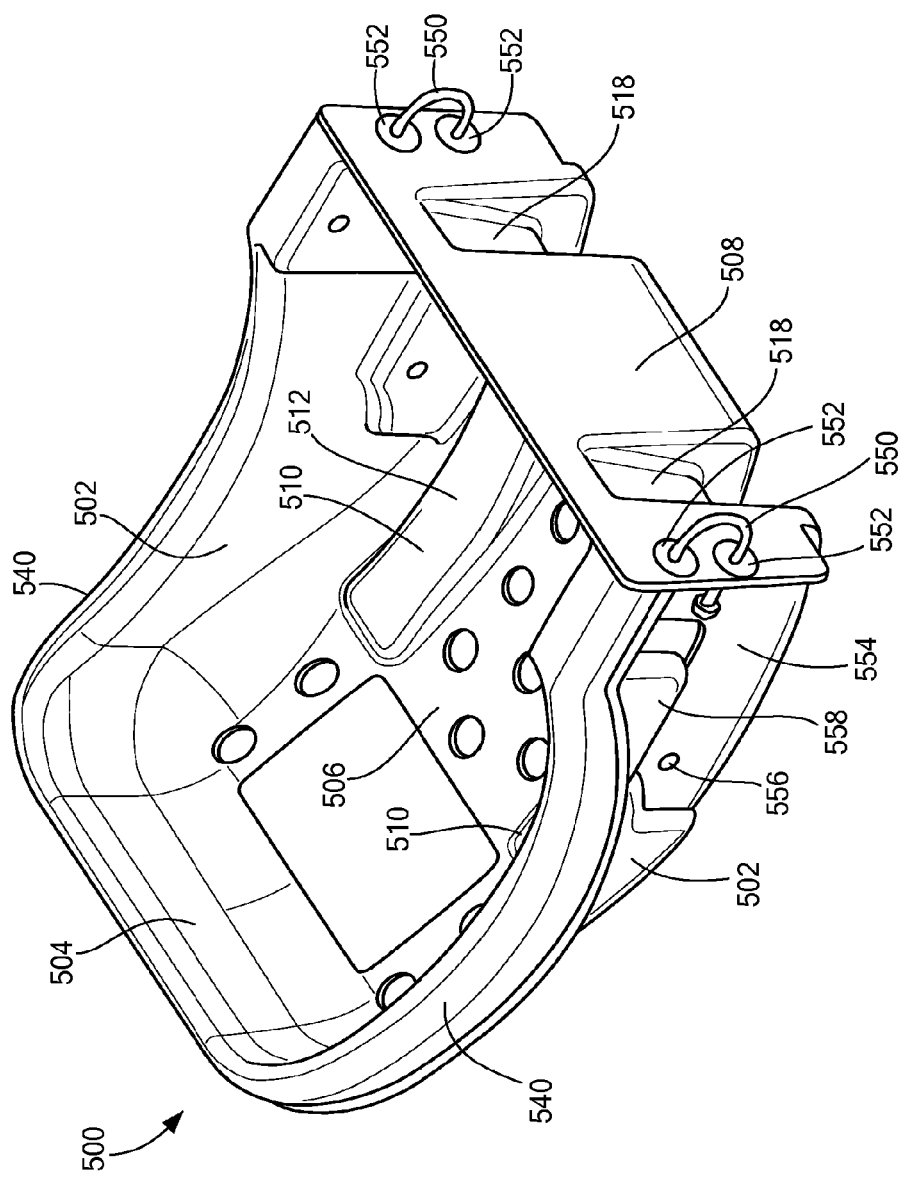
FIG. 5 is a perspective view of the infant carrier holder in accordance with an exemplary embodiment of the present disclosure.

Referring now to FIG. 5, an exemplary embodiment of an infant carrier holder 500, referred to herein as holder 500, is illustrated. Holder 500 has a generally concave shape and is sized to receive any of various infant carriers (not shown). Component parts of holder 500 can each be configured to have a generally concave or scalloped contour, such as opposing sidewalls 502 or a floor 506, as shown in FIG. 5. Holder 500 includes a rear wall 504 that is relatively smaller in height than a front edge 508. Sidewalls 502 and rear wall 504 are connected together to form a concave shape in conjunction with an interior lower surface or floor 506. The concave shape of holder 500 provides lateral stability and support for an infant carrier placed atop and/or in holder 500 and generally in contact with and supported by floor 506.

Holder 500 has dimensions that are suitable for use with a majority of shopping carts 150. For example, holder 500 can be approximately 18 inches long, with front edge 508 having a height about 7 inches, and a width of approximately 14 inches. An interior dimension of holder 500 is sufficiently smaller than an overall dimension of holder 500, which contributes to providing clearances when several holders 500 are involved in a nesting operation, as discussed in greater detail below. Holder 500 can be dimensioned to fit within a basket of a shopping cart of given configuration. Typically, Holder 500 has a smaller width than that of a shopping cart to which it is mounted.

Holder 500 includes ramps 510 that are situated near side walls 502 and toward front edge 508. Ramps 510 are arranged to have an arcuate upper surface 512 that is raised above floor 506 and curves from a high point 514 to a low point 516. The curved shape of surface 512 cooperates with a curved lower surface of an infant carrier to seat the infant carrier in a stable position with respect to holder 500. In general, as described above, infant carriers have curved lower surfaces that can generally cooperate with surface 512 of ramp 510 to contribute to preventing the infant carrier from sliding or changing position on and/or within holder 500.

The radius of curvature of surface 512 can be in the range of from about 50 to about 200 inches, as calculated using Equation 1. The length of the arc described by surface 512 can be determined from the angular range (in radians) of from about 15° to about 25° times the radius. The shape and size of ramps 510 generally acts to prevent infant carriers placed within holder 500 from rocking or sliding by cooperating with the lower curved surface of the infant carrier. In general, ramps 510 and curved surfaces 512 provide a stabilizing support for infant carriers placed atop and/or in holder 500 to permit various models of infant carriers to be uniformly supported and stabilized on holder 500.

Ramps 510 are shown as ending in protrusions 518, which form an abutment for an infant carrier placed in holder 500. Protrusions 518 contribute to spacing the infant carrier from edge 508, as well as a surface to which holder 500 is mounted, for example a surface that is flush with edge 508, such as gate 154. Infant carriers often include a support base that supports the infant carrier bed, and typically has a curved bottom to permit the infant carrier to rock when placed on a flat surface. The support base also typically does not extend as far as the bed of the infant carrier, so that the bed forms an overhang or lip with regard to the support base. Protrusions 518, in addition to abutting against the support base of the infant carrier, provide spacing or an offset for the infant carrier so that the overhang of the bed can be accommodated in holder 500, without the bed abutting against holder 500 or shopping cart 150. Also, by contacting the support base of the infant carrier, protrusions 518 help to provide a more stable support and alignment for the infant carrier, then might otherwise be provided if the bed of the infant carrier were to abut against holder 500 at front edge 508, or abut against shopping cart 150, such as at gate 154.

Figure 9:
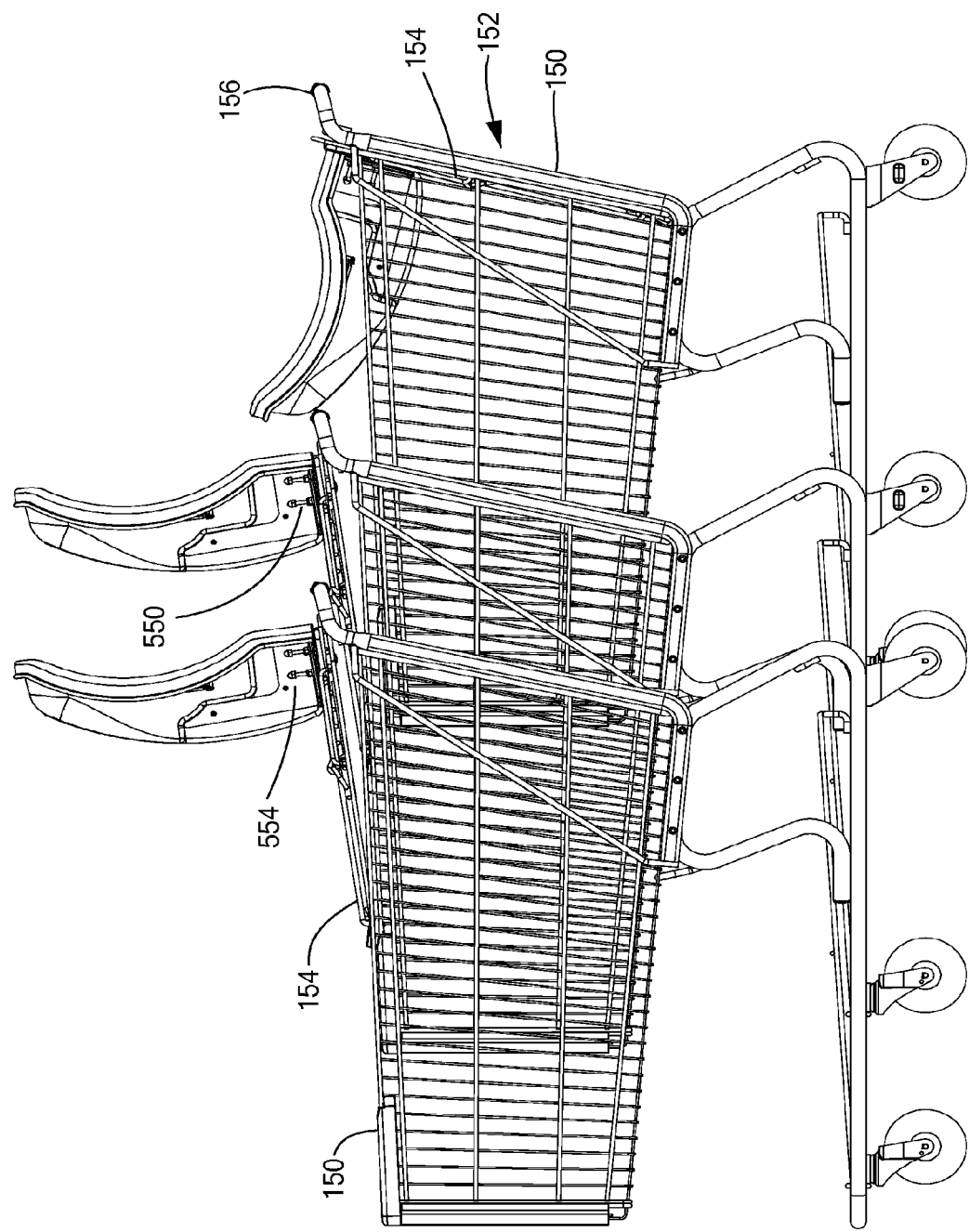
FIG. 9 is a perspective view of the infant carrier holder as used with each of three nested shopping carts in accordance with an exemplary embodiment of the present disclosure.

Referring for a moment to FIG. 9, holder 500 is intended to be usable with shopping cart 150 that nests with other, like shopping carts 150. Shopping carts 150 can generally be nested by urging a front of one shopping cart 150 through a gate opening 152 of another shopping cart 150, tending to urge a gate 154 of the other shopping cart 150 upward in a pivoting motion. The nested shopping carts 150 tend to take up less space, and permit a number of nested shopping carts 150 to be handled all together. Holder 500 facilitates use on nestable shopping cart 150 by being mounted to gate 154, to permit holder 500 to pivot upward with gate 154 in a nesting action.

Figure 6:
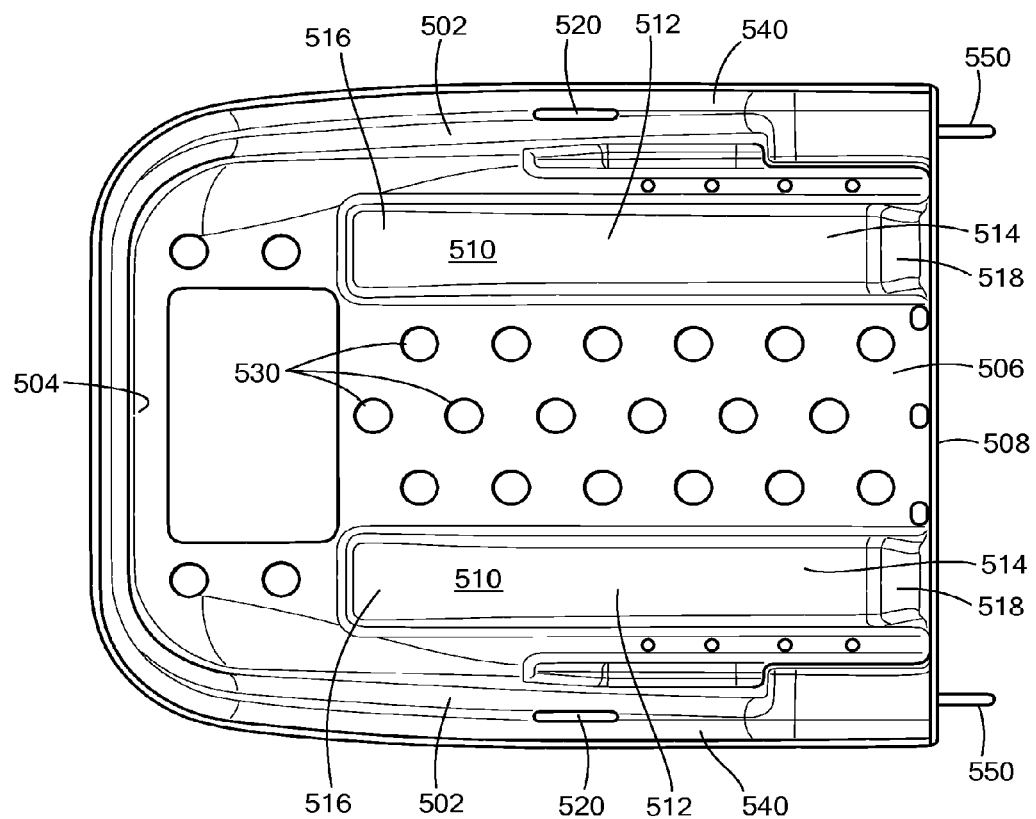
FIG. 6 is a side elevation view of the infant carrier holder in accordance with an exemplary embodiment of the present disclosure.
Figure 7:
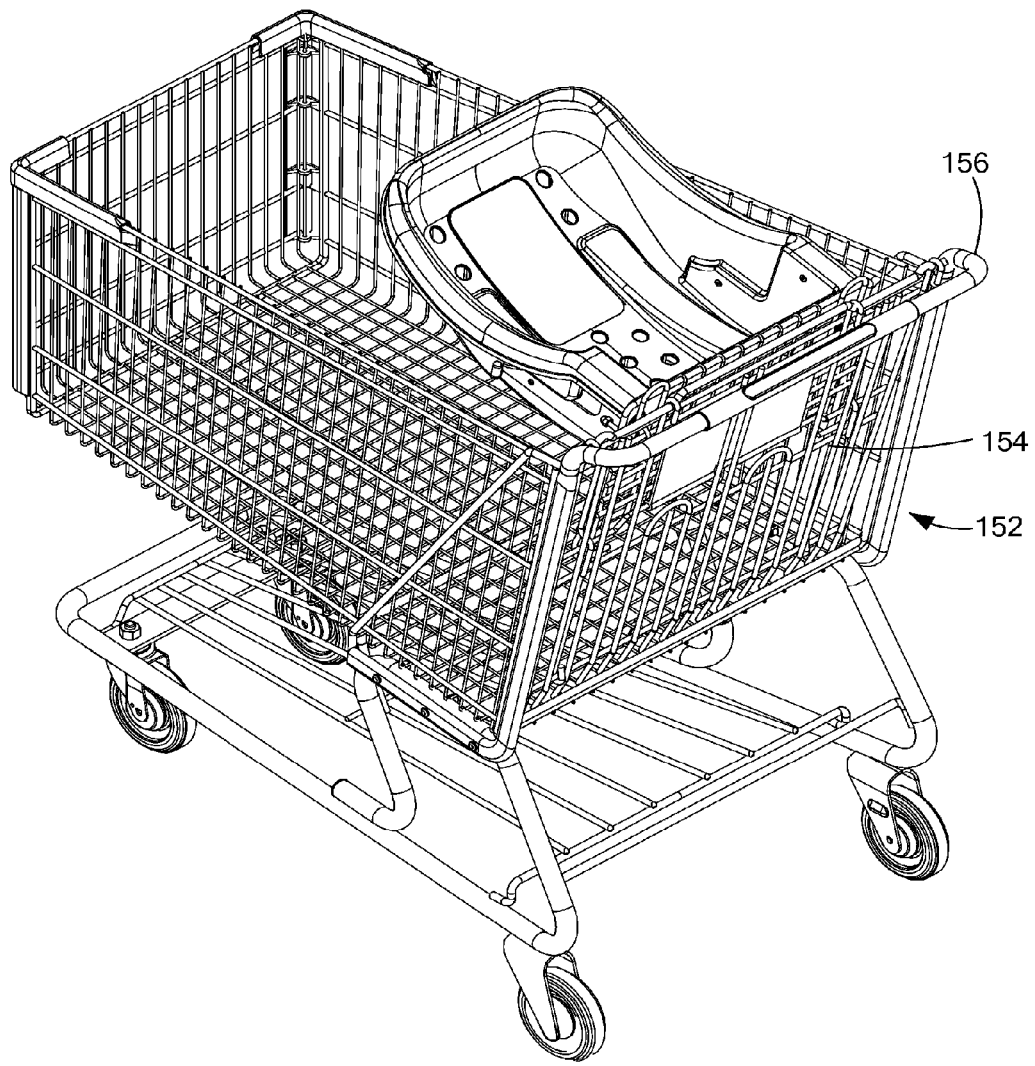
FIG. 7 is a perspective view of the infant carrier holder as used with a shopping cart in accordance with an exemplary embodiment of the present disclosure.
Figure 8:
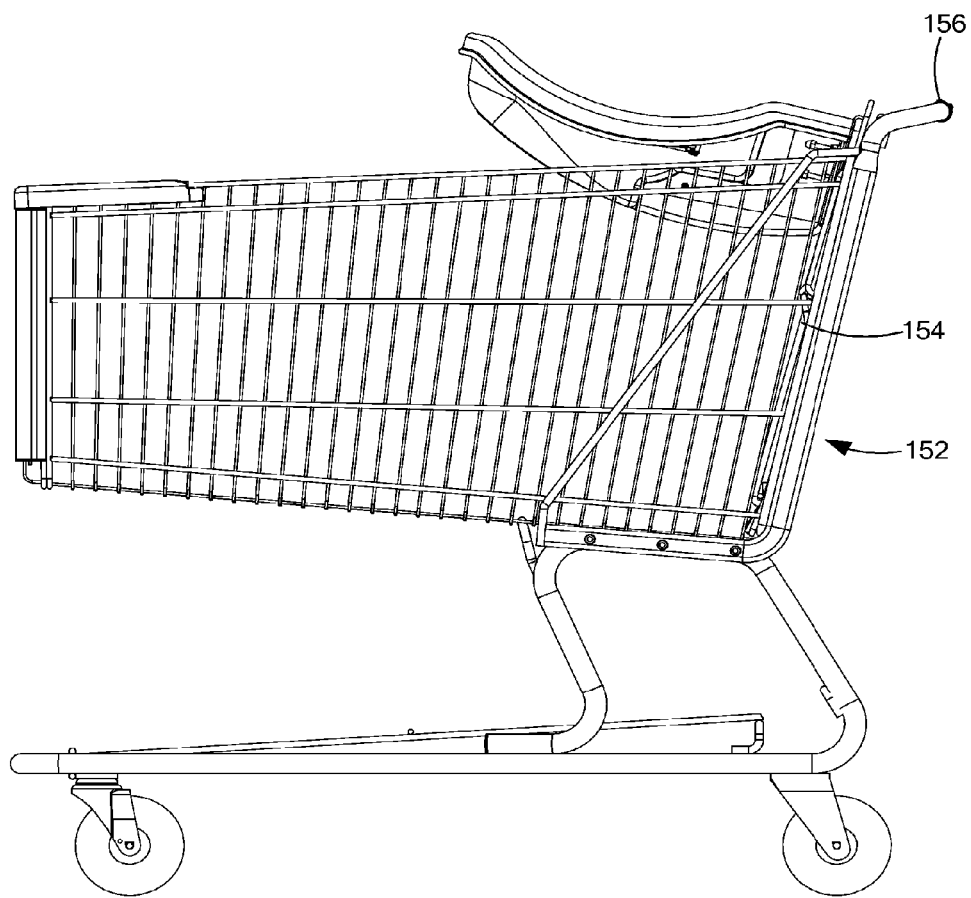
FIG. 8 is a side elevation view of the infant carrier holder as used with a shopping cart in accordance with an exemplary embodiment of the present disclosure.

Referring now to FIGS. 5 and 6, holder 500 is shown in an exemplary embodiment as having a number of through openings 530 arranged in floor 506. Openings 530 permit fluids that might be collected by holder 500 to drain off of floor 506 through openings 530. For example, if holder 500 is exposed to rain in an outdoor environment, holder 500 does not collect the precipitation, instead permitting the rainwater to drain through openings 530. Similarly, if holder 500 is exposed to a spill of liquid in a shopping environment, for example, the liquid can drain through openings 530 to avoid collection of liquid by holder 500. The provision of openings 530 also reduces the amount of material used to construct holder 500. It should be understood that openings 530 are not required, and can be omitted, or provided in any useful pattern to obtain the above-noted benefits.

Holder 500 also includes rails 540 located on upper edges of sidewalls 502. Rails 540 are formed as outwardly curved portions of the upper edge of sidewalls 502. Rails 540 provide a reinforcing structure for sidewalls 502, as well as providing a location for openings 520 that can serve as points of attachment for straps (not shown) that can form parts of a belt (not shown) that can be used to secure an infant carrier in and/or on holder 500. It should be apparent that other types of adjustable or non-adjustable securing mechanisms may be used on holder 500 to secure an infant carrier in and/or on holder 500. Examples of such mechanisms may include harnesses, releasable clamps, elastic cords or other elastic components, retractable stay bars, and any other mechanism that can contribute to securing the infant carrier in holder 500.

Referring now to FIGS. 5-8, holder 500 is mounted to shopping cart 150 with brackets 550. Front edge 508 of holder 500 includes through openings 552 that can accept mounting brackets to secure holder 500 to shopping cart 150. Bracket 550 includes a U-bolt with threaded ends that are passed through openings 552 and on which nuts are screwed to abut an opposing side of front edge 508 to securely affix a portion of gate 154 within bracket 550. Bracket 550 thus securely fastens front edge 508 of holder 500 to gate 154 of shopping cart 150. Holder 500 may also include plates 554 on either side of holder 500 to provide additional support for mounting and operating holder 500. Plates 554 may be composed of a suitable material that provides rigidity and support to at least certain portions of holder 500. For example, plates 554 may be composed of a metal such as brass alloys, or brass constituents, aluminum, or iron and iron derivatives and metal plated structures. Each of plates 554 can be configured to have a portion that abuts an opposing side of front edge 508 to reinforce support provided by front edge 508 being mounted to gate 154. Each of plates 554 can also have a portion that extends along an exterior portion of sidewalls 502, where plates 554 can be securely fastened at points 556 with fasteners such as nuts and bolts, screws, rivets, or any other type of useful fastener. Plates 554 can be arranged under protrusions 558 to provide additional stability, support and leverage for holder 500 when in use in regular operation, including during nesting actions for shopping cart 150.

Front edge 508 has a generally planar shape, so that a relatively large area of front edge 508 contacts gate 154. This relatively large, planar area included in front edge 508 contributes to stabilizing, supporting and providing leverage to holder 500 when an infant carrier is placed in and/or on holder 500. Likewise, the shape of front edge 508 helps to stabilize, support, and leverage holder 500 when gate 154 is pivoted upward in a nesting action, and when holder 500 is in a generally vertical position as a result of gate 154 being pivoted into a position suitable for nesting shopping carts 150 (FIG. 9).

Brackets 550 and openings 552 permit a certain amount of flexibility in mounting holder 500 to shopping cart 150. For example, openings 552 can be oval in shape, or slotted, to permit brackets 550 to be moved in-plane with the plane of front edge 508. Brackets 550 are configured to mount to horizontal member of gate 154, however other or additional brackets configured to mount to vertical and/or horizontal members of gate 154 can be provided.

In general, holder 500 is mounted to gate 154 with brackets 550 at a selectable height. According to an exemplary embodiment, holder 500 is mounted to gate 154 at a highest extent available for accommodating brackets 550. Mounting holder 500 at such a location accommodates nesting of another holder 500, as illustrated in FIG. 9. In addition, holder 500 being mounted to gate 154 avoids interference with handle 156 to permit a user to easily grasp handle 156 to push shopping cart 150. It should be understood that holder 500 can be mounted, for example, using additional brackets (not shown), to extend and be located above a highest extent of gate 154 or handle 156. Mounting holder 500 near a top of gate 154 provides the advantages of a reasonable height for placing an infant carrier in holder 500 for a majority of users, as well as a low center of gravity for the infant carrier with respect to shopping cart 150. Such a placement of holder 500 also reserves the majority of shopping cart 150 for products being selected for purchase, while preserving the ability of shopping cart 150 to nest with other like shopping carts 150, even when those other shopping carts 150 include a holder 500.

According to an exemplary embodiment, brackets 550 used to mount holder 500 to shopping cart 150 can include angular adjustment devices (not shown) that can be used to adjust the mounting angle of holder 500. Typically, an infant carrier has a desired angle of approximately 45 degrees for positioning an infant. The angle of 45 degrees for the infant is typically obtained when the infant carrier is rested on a flat surface, or in a mating base used for a motor vehicle seat. The concave or scallop shape of holder 500 promotes positioning of an infant carrier at a desired angle to obtain the desired 45 degrees for the infant. By adjusting the mounting angle of holder 500 mounted on shopping cart 150, the desired angle for supporting an infant carrier can be adjusted on an individual basis per shopping cart 150. Accordingly, such a mounting angle adjustment, which can be achieved using wedges (not shown) located between front edge 508 and shopping cart 150, provides a customized mounting solution for obtaining a desired mounting angle. Such wedges can be provided in different angular configurations to permit selection of various mounting angles. Such wedges can also be combined to obtain a desired angle for mounting holder 500. Alternately, or in addition, holder 500 can be integral with shopping cart 150, such as by being formed as part of gate 154. In such an embodiment, front edge 508 may be omitted, so that gate 154 acts as a front edge for holder 500 that is integrated with shopping cart 150. In such an integral embodiment, angular adjustment devices can also be used to obtain a desired mounting angle.

Holder 500 is generally concavely curved in shape to obtain several advantages. The generally concave shape of holder 500 provides additional security for an infant carrier placed within holder 500, as the infant carrier is generally urged into a stable location by the curved surfaces, including rear wall 504, floor 506, sidewalls 502, ramps 510 and protrusions 518. In particular, an infant carrier placed in holder 500 tends to be urged by the concave shape to slide downward toward gate 154 of shopping cart 150. An end of a carrier support (not shown) or an end of the carrier (not shown) is thus urged toward edge 508 to abut protrusions 518. This configuration can thus support the carrier in a stable position due to the urging provided by the concave shape of holder 500 and the abutment against protrusions 518.

The generally concave shape also contributes to permitting holder 500 to perform a nesting action. Referring to FIG. 9, an exterior lower edge portion of holder 500 is relatively higher than handle 156, due at least in part to the generally concave shape of holder 500. When shopping cart 150 is urged into another cart in a nesting action, holder 500 can ride over handle 156 to urge gate 154 to pivot upward. Moreover, such positioning permits holder 500 to ride over handle 156 when another cart is nested into shopping cart 150, so that handle 156 does not block holder 500 from pivoting upward with gate 154 during such nesting.

When another cart is nested into shopping cart 150, and gate 154 is pivoted upward, holder 500 moves from riding over handle 156 to an upright position. In moving through these positions in a pivoting motion, holder 500 avoids contact with another holder 500 mounted to another shopping cart 150 into which shopping cart 150 is being nested, as illustrated in FIG. 9. The concave shape of rails 540, for example, provides a clearance for a rear edge and rear wall 504 of holder 500 to pass by during nesting without interference between holders 500.

Holder 500 can also be configured to have rails 540 contact and slide on rails 540 of a second holder 500 on a second shopping cart 150 in a nesting action. In this exemplary configuration, a first shopping cart 150 is nested into a second shopping cart 150, as illustrated in FIG. 9, and rails 540 of a first holder 500 on the first shopping cart 150 contact and ride on rails 540 of a second holder 500 on the second shopping cart 150 during nesting. Since rails 540 are concave or scallop shaped, rails 540 of the first holder 500 can contact rails 540 of the second holder 500 on a curved contour to reduce impact. Rails 540 of the first holder 500 can then ride the curved rails 540 of the second holder 500, which urge the first holder 500 into an upright position to assist in the nesting action. If the first holder 500 is attached to gate 154, gate 154 is also urged to pivot upward toward a nesting position, which can contribute to permitting an additional shopping cart 150 to nest with the already nested cart 150. Rails 540 of holder 500 can be provided with a hardened plastic or metal surface to permit rails 540 of another holder 500 to contact and slide on the hardened plastic or metal surface of the so configured rails 540. It should be understood that any type of material can be used for the surface of rails 540 to permit contact and sliding or riding action by rails 540 or rear wall 504 of another holder 500.

The concave shape of rails 540 also contribute to reducing a height of sidewalls 502. The reduced height of sidewalls 502 contributes to stabilizing an infant carrier placed in holder 500. Infant carriers typically have a handle that the user can grasp and use to transport the infant carrier. The handle is typically coupled to the infant carrier at a pivot joint on lateral sides of the infant carrier. Often, the pivot joint is locked to prevent the infant carrier from pivoting when being carried by the handle. The pivot joints of the infant carrier typically extend laterally from the sides of the infant carrier and are often located near the bed portion of the infant carrier. By providing sidewalls 502 with a reduced height, the pivot joints of the infant carrier are spaced from rails 540 of holder 500, to avoid having the pivot joints of the infant carrier rest on rails 540 of holder 500. With this configuration, the infant carrier is supported by its base on floor 506 and/or ramps 510, to provide a stable support for the infant carrier. The clearance from the pivot joints of the infant carrier provided by the reduced height of sidewalls 502 avoids the infant carrier being supported by the pivot joints. Such a relationship avoids a less stable support arrangement for the infant carrier, where the infant carrier would likely be able to rock or move when supported by the pivot joints.

It should be understood that carrier 500 can be mounted in other locations on shopping cart 150, using brackets 550 or other attachment configurations. In some locations, holder 500 may interfere with shopping cart 150 being urged into a nesting configuration with another shopping cart 150, or may interfere with another shopping cart 150 being urged into a nesting configuration with shopping cart 150 having holder 500. For example, holder 500 may be mounted within a basket of shopping cart 150 to lower a height of an infant carrier placed on or within holder 500. In such a location, holder 500 may be below handle 156 and be blocked from pivoting upward in a nesting action. Holder 500 being located lower in the basket of shopping cart 150 may be free to pivot upward in a nesting action when shopping cart 150 is not nested into another cart, but not when another cart is nested into shopping cart 150. Because shopping cart 150 with holder 500 in a lower position in the basket may respond differently to different nesting actions, it may be treated separately from other carts by a manager of a retail establishment as providing the feature of an infant carrier holder.

Figure 10:
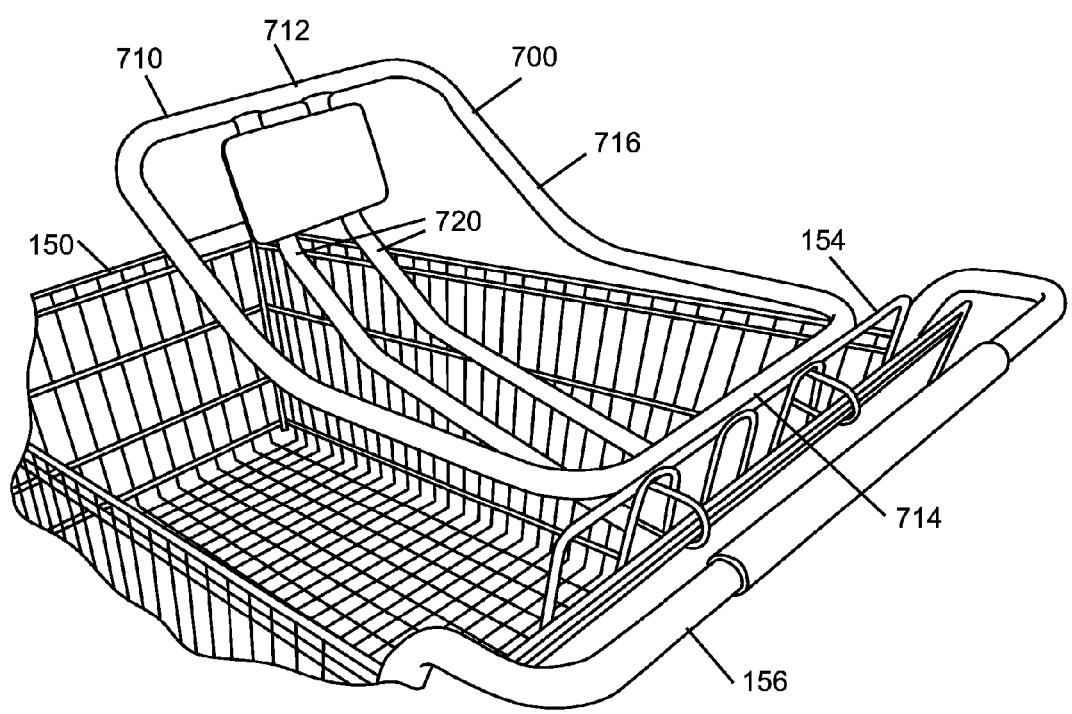
FIGS. 10-12 are perspective views of another exemplary embodiment in accordance with the present disclosure.
Figure 11:
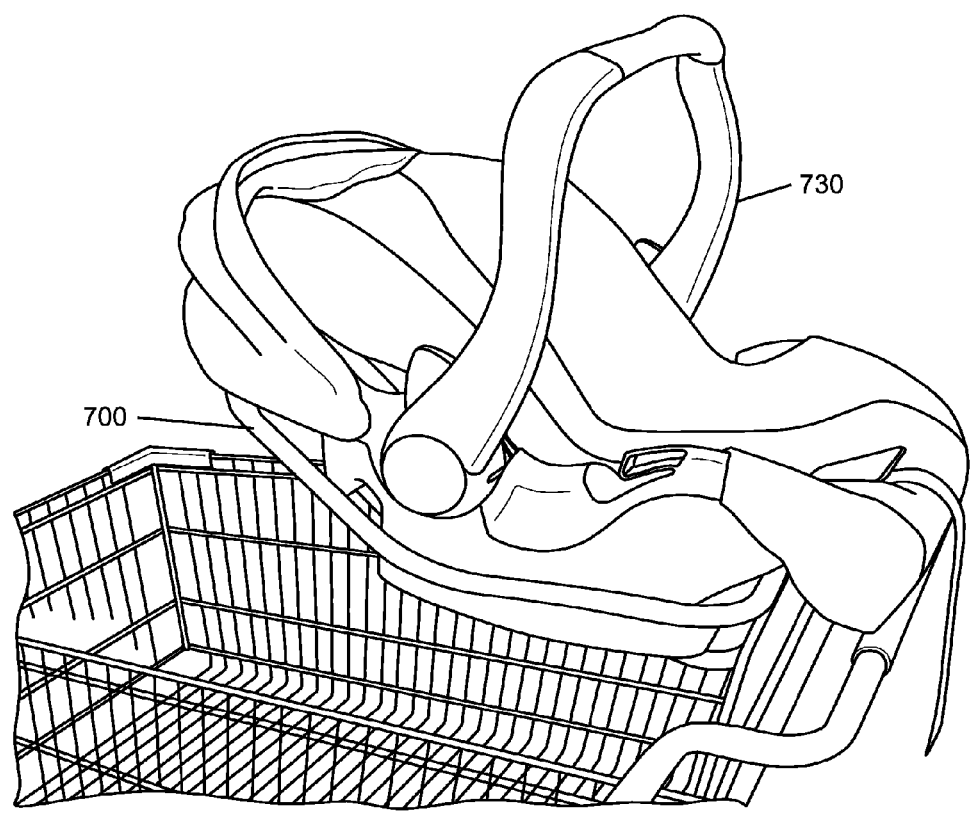
Figure 12:
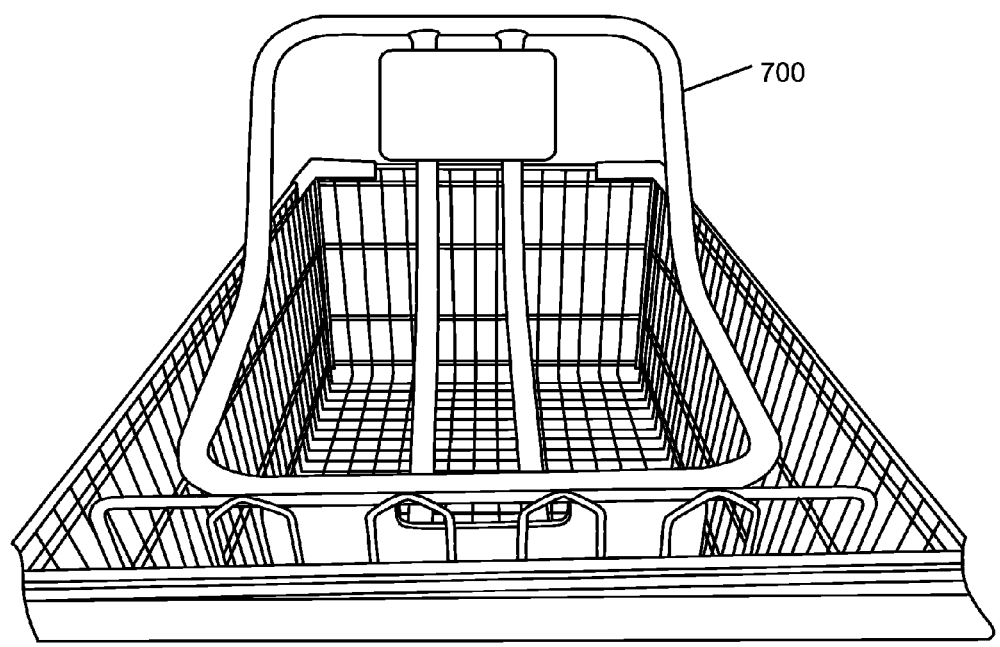

Referring to FIGS. 10-12, another exemplary embodiment of an infant carrier holder 700 in accordance with the present disclosure is illustrated. Holder 700 is formed out of tubular material that can be metal, such as aluminum or stainless steel, or other materials including plastics and composites of fiber and polymers, or any other material suitable for providing the desired strength and durability for supporting an infant carrier in harsh environments, such as is discussed above.

Holder 700 illustrated in FIGS. 10-12 is similar in function to holder 500, as being mountable to a gate 154 of a shopping cart 150 to pivot upward with gate 154 in a nesting action. Holder 700 is scoop-shaped, or interiorly concave, similar to holder 500, to permit sequential shopping carts 150 with holder 700 mounted thereon to have clearance for a pivoting action when gate 154 to which holder 700 is mounted pivots upward in a nesting action. In addition, the shape permits holder 700 to be urged upward, for example by a handle 156 of shopping cart 150 into which a shopping cart 150/holder 700 combination is being nested. The concave shape of the holder 700 provides a front edge 712 that is generally higher than handle 156 of shopping cart 150 into which the holder 700/shopping cart 150 combination is being nested when holder 700 is mounted to gate 154 of shopping cart 150. With this shape, size and position, holder 700 is able to pivot with gate 154 in a nesting action, as well as urge gate 154 to pivot when being nested, and can swing upward with gate 154 without interference or interfering with other shopping carts 150 or holders 700 mounted thereto.

Holder 700 illustrated in FIGS. 10-12 includes support members 720 that extend from a front 710 to a back 714 of holder 700 near a centerline of holder 700. Support members 720 provide support for an infant carrier 730, as illustrated in FIG. 11, near a centerline of infant carrier 730. Accordingly, illustrated holder 700 does not depend on ramps to stabilize infant carrier 730, but rather a stabilizing centerline support that fits infant carriers in general. For example, infant carriers often have two curved supports at a lower portion to support the infant carrier being placed on a surface, such as a table or floor, while permitting the infant carrier to be rocked on the curved supports. The curved supports are typically implemented as runners, such as might be found on a rocking chair, with a gap in between. Support members 720 of illustrated holder 700 support infant carrier 730 in the gap between the curved supports of infant carrier 730 to provide a secure and stable mounting for infant carrier 730.

In addition, an outer frame 716 of illustrated holder 700 acts to stabilize infant carrier 730 while being supported by support members 720. Outer frame 716 tends to retain infant carrier 730 in a position on support members 720, and thus on holder 720, to enhance the stability and support for infant carrier 730. The size and shape of outer frame 716 also helps to urge infant carrier 730 towards gate 154, or rear, of shopping cart 150 to provide additional stabilization, as illustrated in FIG. 11. By urging infant carrier 730 into contact with gate 154 or outer frame 716 of holder 700 that is adjacent gate 154, holder 700 contributes to the positioning of infant carrier 730 in a stable and secure location. This location is supported by support members 720 and their generally concave shape, and gate 154 of shopping cart 150, as well as by outer frame 716 of holder 700. As with the other example embodiments discussed above, illustrated holder 700 can be provided with straps, buckle segments and/or adjusters to secure infant carrier 730 to holder 700. Any suitable type of securing mechanism can be used, including those mentioned above, to secure infant carrier 730 to holder 700.

It should be understood that while the present disclosure describes various example embodiments of an infant carrier holder, numerous variations and modifications can be applied to the disclosed embodiments, or other embodiments, that should be considered within the scope of the present disclosure. For example, the infant carrier holder can be mountable on or integral with a transport device, including a shopping cart. The protrusions or ramps, such as protrusions 518 or ramps 510, can be provided or omitted according to useful configurations of the infant carrier holder. The infant carrier holder can be located within a basket of a shopping cart, or mounted outside of a basket and can be configured to face various directions, while being nestable or non-nestable with other transport devices, shopping carts and/or infant carrier holders. Moreover, characteristics described for a given embodiment of the infant carrier holder can be applied to or omitted from other example embodiments described herein. For example, one or more of the embodiments described herein can be configured so that the infant carrier holders are stackable for purposes of compact shipping. As another example, the infant carrier holder may be provided as a plastic or metal wire frame that can be attached to or integral with a shopping cart.

Figure 13:
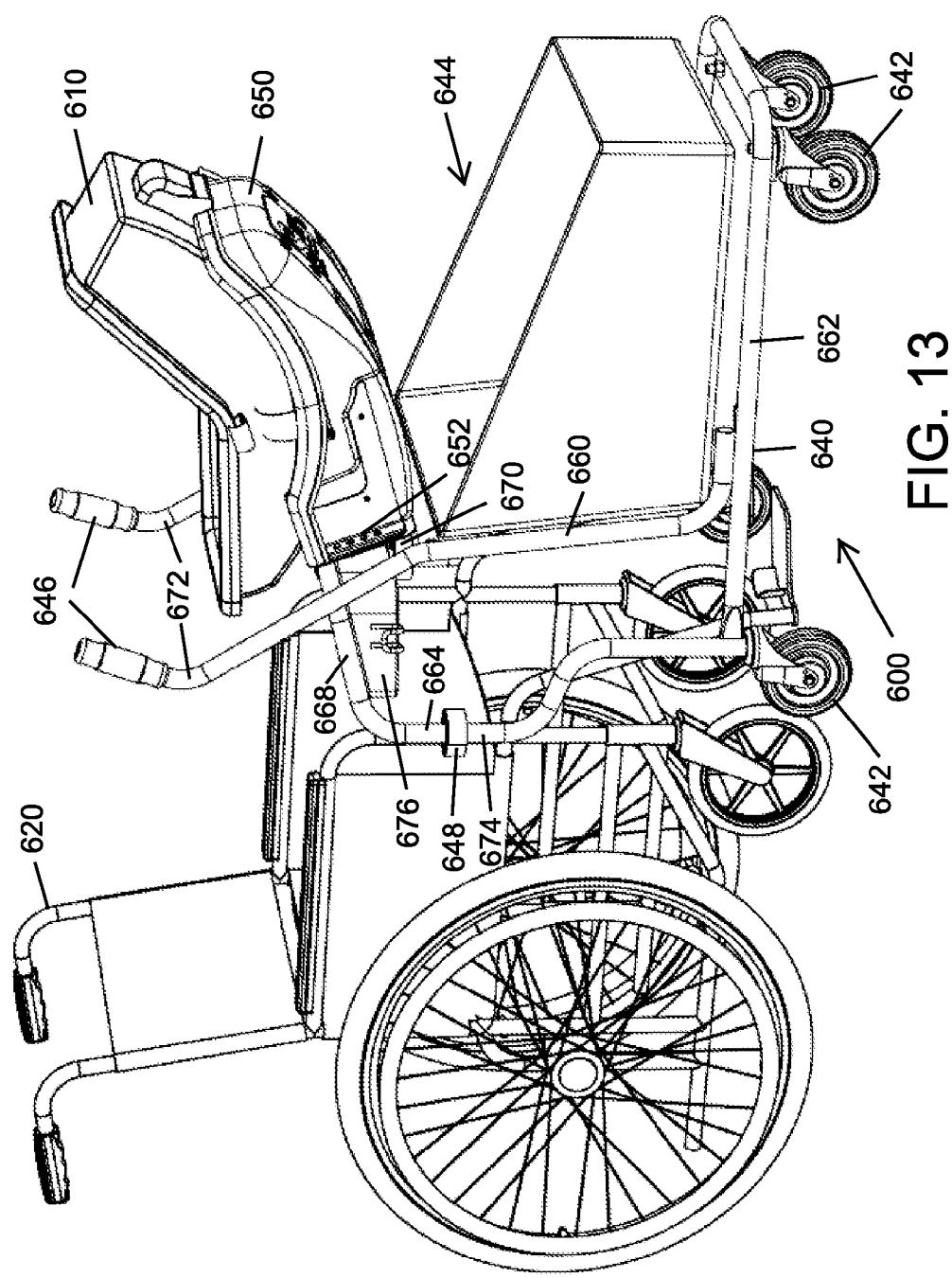
FIGS. 13-15 are various views of an infant carrier transport in accordance with an exemplary embodiment of the present disclosure. The infant carrier transport may utilize an infant carrier holder in accordance with any of the above described infant carriers. The infant carrier transport may be used with a wheelchair, as shown in FIG. 13, or may be used by a person in a standing position.
Figure 14:
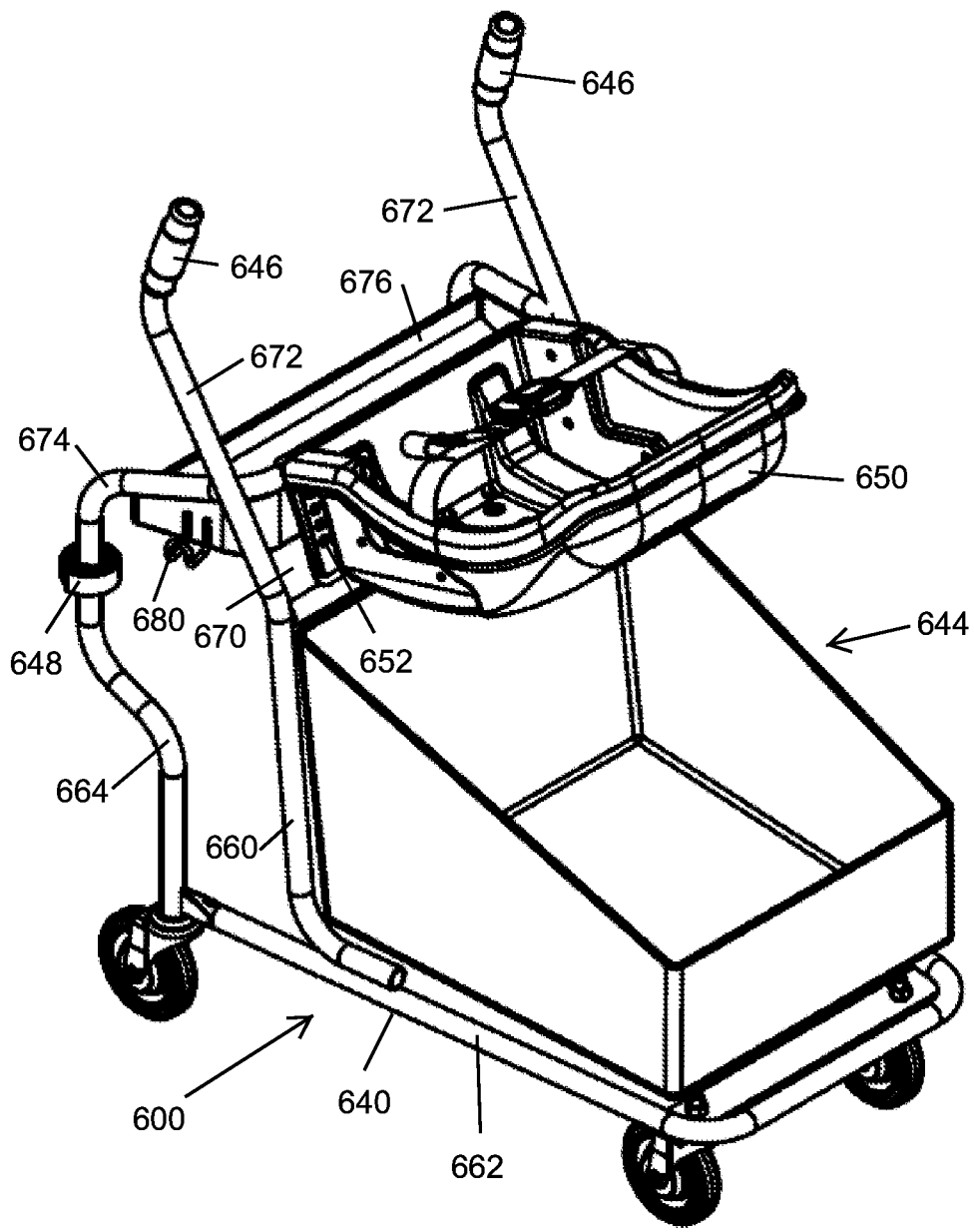
Figure 15:
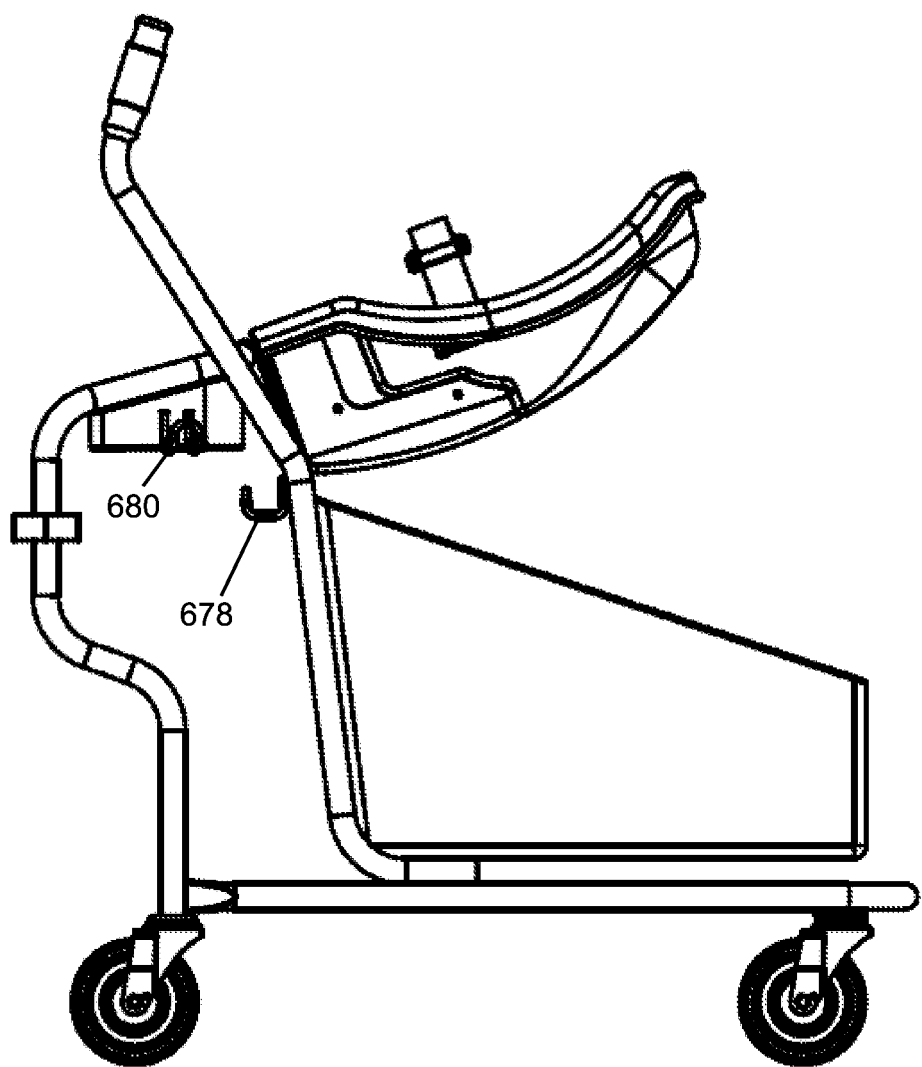

Referring now to FIGS. 13-15, another example implementation of an infant carrier transport 600 is provided. Infant carrier transport 600 can be used in applications for a person sitting or standing and transporting an infant in an infant carrier 610. For example, a person sitting in a wheelchair 620 can use infant carrier transport 600 to transport infant carrier 610 to avoid lifting and carrying infant carrier 610, or to avoid positioning infant carrier 610 on wheelchair 620, including positioning infant carrier 610 in the person's lap.

Infant carrier transport 600 is provided with a frame 640 connected to and supported by wheels 642. Frame 640 includes an upright middle section 660, which is connected to a base section 662 and an upright rear section 664. Middle section 660 contributes to providing rigidity to frame 640, as well as supporting a top portion 668 of rear section 664.

Middle section 660 is also connected to a support plate 670 that spans between two upright portions 672 of middle section 660. Support plate 670 can be provided with mounting elements such as holes that can be used to mount infant carrier holder 650. Support plate 670 may be varied in position to adjust a mounting position for a mounted infant carrier holder 650. For example, support plate 670 can be moved upward and downward, or have multiple mounting holes to permit a mounting height for infant carrier holder 650 to be varied. Support plate 670 can also be modified in position translationally, e.g., in a horizontal direction, to contribute to adjust a mounting angle of infant carrier holder 650. Infant carrier holder 650 can also be fastened to top portion 668 in a pivoting attachment to permit infant carrier holder 650 to be supported at different angles. Thus, the arrangement of support plate 670 and top portion 668 is suitable for mounting an infant carrier holder 650 at a desired angle. Support plate 670 may also be used to support a hook 678 that can be used to hang items for transport on infant carrier transport 600.

Rear section 664 is shaped to have a portion 674 that extends or bows rearward of infant carrier transport 600. Portion 674 provides a region that can be used as a lower handle for a person seated. For example, portion 674 can be located generally at about knee level, or above wheels 642 and at least partially below infant carrier holder 650. A person using wheelchair 620 can grasp portions 674 and move infant carrier transport 600 in concert with movement of wheelchair 620, for example. Portion 674 extends in a rearward direction of infant carrier transport 600 and provides a shape and position that contributes to several functions. For example, portion 674 creates a space between a rear of infant carrier transport 600 and middle section 660. The space is large enough to accommodate a person's legs when riding in wheelchair 620 when infant carrier transport 600 is fastened thereto. Base section 662 includes an open area between rear section 664 and middle section 660. The open area contributes to the space to accommodate a person's legs when riding in wheelchair 620.

Portion 674 extends a distance between a rear of infant carrier transport 600 and middle section 660, which contributes to obtaining space for a tray 676 that is located near top portion 668. Tray 676 can be used to provide easy-access storage for items while transporting an infant in infant carrier transport 600. For example, a person being moved in wheelchair 620 may have items that are helpful for caring for an infant that can be placed in tray 676 for ease of access and to permit the person to have their hands free for other tasks. Tray 676 includes a hook 680 that may be used to hang items that are transported with infant carrier transport 600.

Infant carrier holder 650 can be implemented as infant carrier holder 500 or 700, and can be provided with an adjustable mount 652 that permits mounting of infant carrier holder 650 at different angles. Frame 640 can be provided with wheels, such as casters 642, for example, that may be fixed in position, or pivotable. Frame 640 may be provided with a storage space 644 to permit other articles to be transported along with infant carrier 610. Handles 646 may be provided to frame 640 to permit a person to grasp and push or pull infant carrier transport 600. Handles 646 may also be used as grips to support a standing person pushing infant carrier transport 600. For example, a person that may have some difficulty in walking can grip handles 646 and support themselves by bearing weight on infant carrier transport 600, while moving the same. Multiple handles 646 may be provided in positions sufficient to permit a person to use transport 600 by grasping handles 646 in either a standing or a sitting position. Transport 600 may be provided with a brake (not shown) to slow or obstruct movement of transport 600, or to lock transport 600 in place. Mount 652 may be provided to the transport as a variable mount to permit the height of the infant carrier holder 650 to be adjusted. The adjustable height of the mounted infant carrier holder 650 permits persons in various positions and of different heights to more easily use infant carrier transport 600. For example, a person using transport 600 may wish to have infant carrier 610 positioned at eye level if they are in a sitting position, such as may be the case if the person is sitting in wheelchair 620, for example.

Infant carrier transport 600 illustrated in FIGS. 13-15 may utilize infant carrier holder 650 with any of the above described infant carriers. Infant carrier transport 600 may be used with wheelchair 620, as shown in FIG. 13, or may be used by a person in a standing position.

Transport 600 can be coupled to wheelchair 620 or other personal transportation device with a releasable attachment mechanism 648. Attachment mechanism 648 may be implemented, for example, as hook and loop fastened straps, buckles, adjustable bars, tube frames or any other suitable device that can couple transport 600 to wheelchair 620 or to any other personal transportation device suitable for being coupled to transport 600. Transport 600 can be configured to accommodate multiple infant carriers 610, for example, in a stacked or side-by-side configuration. According to an example, wheels 642 of transport 600 can all pivot around an upwardly facing axis when transport 600 is coupled to wheelchair 620, to permit transport 600 to move in lateral directions in accordance with the movement of wheelchair 620.

The foregoing description has been directed to particular embodiments of the present disclosure. It will be apparent, however, that other variations and modifications may be made to the described embodiments, with the attainment of some or all of their advantages. The appended claims are intended to cover all such variations and modifications as come within the scope of the disclosed invention.

What is claimed is:

1. An infant carrier transport for transporting an infant carrier, comprising:
a frame for supporting the infant carrier;
a plurality of wheels connected to and supporting the frame for movement;
an infant carrier holder attached to the frame near a rear of the frame for stably supporting the infant carrier;
a first handle section of the frame including a portion arranged at a height above the wheels and below the infant carrier holder;

a second handle section of the frame including a portion arranged above the infant carrier holder; and
a continuously open area at the rear of the frame bordered laterally by a pair of rear wheels and the first handle section, being open vertically from the rear wheels to the first handle section, and extending a depth into the frame from the rear such that at least a portion of the infant carrier holder is over and above the open area.

2. The transport according to claim 1, further comprising a mounting element for mounting the infant carrier holder.

3. The transport according to claim 2, further comprising an adjustable mechanism for adjusting one or more of an angle of mounting or a height of mounting the infant carrier holder on the mounting element.

4. The transport according to claim 1, wherein the infant carrier holder further comprises:
   a floor element for supporting the infant carrier;
   a plurality of sidewalls connected to the floor element for limiting lateral movement of the infant carrier; and
   a mounting component located on at least one surface of the infant carrier holder and configured to be coupled to the frame to mount the infant carrier holder to the frame.

5. The transport according to claim 1, wherein the open area further comprises a space at the rear of the frame above the first handle section.

6. The transport according to claim 1, further comprising a storage space located above the wheels.

7. The transport according to claim 1, further comprising a storage space above the portion of the handle section.

8. The transport according to claim 1, further comprising a fastener on the portion of the first handle section for fastening the frame to another transport device.

9. A method for enabling transport of an infant carrier, comprising:
   supporting an infant carrier holder on a frame;
   supporting the frame on a plurality of wheels;
   providing a first handle section of the frame with a portion arranged at a height above the wheels and below the infant carrier holder;
   providing a second handle section of the frame including a portion arranged above the infant carrier holder; and
   providing a continuously open area at the rear of the frame bordered laterally by a pair of rear wheels and the first handle section, being open vertically from the rear wheels to the first handle section, and extending a depth into the frame from the rear such that at least a portion of the infant carrier holder is over and above the open area.

10. The method according to claim 9, further comprising mounting the infant carrier holder at a location and angle determined by a mounting component attached to the frame.

11. The method according to claim 10, further comprising adjusting one or more of an angle of mounting or a height of mounting the infant carrier holder on the mounting element.

12. The method according to claim 9, further comprising:
   providing the infant carrier holder with:
      a floor element for supporting the infant carrier;
      a plurality of sidewalls connected to the floor element for limiting lateral movement of the infant carrier; and
      a mounting component located on at least one surface of the infant carrier holder and configured to be coupled to the frame to mount the infant carrier holder to the frame.

13. The method according to claim 9, further comprising providing a space at the rear of the frame above the first handle section.

14. The method according to claim 9, further comprising providing a storage space located above the wheels.

15. The method according to claim 9, further comprising providing a storage space above the portion of the handle section.

16. The method according to claim 9, further comprising fastening the first handle section of the frame to another transport device.

17. An infant carrier transport for transporting an infant carrier, comprising:
   a frame for supporting the infant carrier;
   a plurality of wheels connected to and supporting the frame for movement;
   an infant carrier holder attached to the frame for stably supporting the infant carrier;
   a handle section of the frame including a portion arranged at a medial height above the wheels; and
   a continuously open space open to a rear of the transport being continuously open and free of structure and bounded in a front-to-back direction by a frame section oriented in an upward direction and that is spaced forward of rear wheels of the plurality of wheels, and bounded in an upward direction by the handle section.

18. The transport according to claim 17, wherein the infant carrier holder further comprises:
   a floor element for supporting the infant carrier;
   a plurality of sidewalls connected to the floor element for limiting lateral movement of the infant carrier; and
   a mounting component located on at least one surface of the infant carrier holder and configured to be coupled to the frame to mount the infant carrier holder to the frame.

* * * * *